United States Patent

[11] 3,530,897

| [72] | Inventor | Angus Buchanan<br>2453 6th Ave., Seattle, Washington 98134 |
|---|---|---|
| [21] | Appl. No. | 769,949 |
| [22] | Filed | Oct. 23, 1968 |
| [45] | Patented | Sept. 29, 1970 |
| [73] | Assignee | |

[54] PISTON ACTUATED FLUID DISPLACEMENT INTERLOCK SERVO FOR MULTICONTROL VALVE SYSTEMS
8 Claims, 3 Drawing Figs.

[52] U.S. Cl. .................................................. 137/637,
 137/608, 137/637.1, 137/625.66, 137/625.25
[51] Int. Cl. ...................................................... F16k 11/22
[50] Field of Search........................................... 137/637,
 637.1, 635, 636, 609, 608, 625.66, 626.25

[56] References Cited
UNITED STATES PATENTS

| 2,206,163 | 7/1940 | Clench | 137/637.1X |
| 2,865,402 | 12/1958 | Miller | 137/637.1 |
| 3,032,068 | 5/1962 | Bunyan | 137/637.1X |
| 3,289,701 | 12/1966 | Booth | 137/637.1 |

*Primary Examiner*—Clarence R. Gordon
*Attorney*—Christensen, Sanborn and Matthews

ABSTRACT: Volitional resetting of any individual or plurality of valves selected from among a larger group of valves automatically resets in the reverse sense an equal number of valves in the group through the motor action of hydraulic pistons, or equivalents, respectively associated with the individual valves and working through respective columns of hydraulic liquid comprising part of a body of such liquid filling out the confinement volume of a hydraulic enclosure including passageways which afford flow communication between the columns. Provision for adjustability of the confinement volume of the enclosure permits selective conditioning of the system for motion interlock between single valves, or between pairs of valves, or other combinations.

Patented Sept. 29, 1970

3,530,897

INVENTOR,
ANGUS BUCHANAN
BY
Christensen, Sanborn & Matthews
ATTORNEYS

PISTON ACTUATED FLUID DISPLACEMENT INTERLOCK SERVO FOR MULTICONTROL VALVE SYSTEMS

DESCRIPTION OF THE PREFERRED EMBODIMENT

This invention relates to a new and improved hydraulic fluid type motion interlock system of the type wherein the motion of any one or more valves of a group into a selected reset position will automatically induce reverse motion or displacement of one or more other valves in the system, such that only one or more valves may be moved to a reset position at any time. More specifically, a broad object of the invention is to devise a simple, reliable and versatile means to accomplish the motion interlock function applicable to any of different kinds of valve systems using the term "valve" as applying not only to hydraulic and pneumatic valves but also to their electrical or mechanical couterparts in analogous systems of control. The invention is herein illustratively described by reference to the presently preferred embodiment thereof as applied in modular form to a multimodular or stack valve assembly; however it will be recognized that certain modifications and changes thereof with respect to details and various other applications may be made without departing from the essential features involved.

It is often desirable in hydraulic or pneumatic equipment, either for reasons of operating within the power limits of a common hydraulic pump, for reasons of safety, or for specific functional reasons, to insure that the hydraulic motors or other instrumentalities being controlled by the different valves are operated one at a time or a selected number, less than all, at a given time. It is thus important in these systems to provide suitable interlock or lockout means assuring that no matter how the operator attempts to reset the valves which control passage of operating fluid to the energized instrumentalities he will not be permitted to violate the functional limits or functional requirements of the total multi-instrumentality system. Prior efforts to solve this problem hydraulically or pneumatically have usually entailed complex hydraulic or pneumatic control systems in which pressure from the master power source is utilized directly in some manner through bypass passages to exert force upon or deny pressure fluid to a previously set valve in order to return it to a reset position or render its control ineffective in some manner when another valve is operated. These provisions have been complex and have unduly increased the cost and reduced the reliability of hydraulic control valving systems. They have also been unsuitable for use with compound modular conventional, commercially available, stack valves and the like.

The present invention fulfills this objective by providing a means by which, in one aspect, modular stack valves or equivalents may be banked together in a common assembly of any number of modules and provided with motion interlock through the use of interlock modules matched to the valve modules in ready fashion. In particular the invention makes this possible with commercially available stack valve units with little or no modification therein.

A further object of the invention is to provide a versatile motion interlock means such that the interlock function may be performed for individual valves or for a selected plurality of valves and wherein means for adjusting to valve groups of different number is readily incorporated in the assembly. A related object is to provide a means of the latter nature also adapted to compensate or take up for the effects of hydraulic fluid leakage or of temperature expansion and contraction in the system.

Still another object is to devise such a system which requires few and simple parts, does not rely upon external pressure sources or force-producing means, and is self-neutralizing in sofar as residual forces are concerned which, in some systems, might through wear of seals or failure of parts tend to displace valves out of their assigned positions unintentionally between volitional resettings.

With these and related objects in view, the invention features the use of individual hydraulic pistons or equivalents associated with the respective valves, each such piston working in a cylinder containing a column of hydraulic fluid as part of a total enclosure having passageways affording communication between the columns of hydraulic liquid. The hydraulic liquid confined in the enclosure is normally maintained under slight pressure such that displacement of one piston produces equal and opposite displacement of another, the action occuring singly or in pairs or other size groups of valves. Interconnected piston and cylinder module units with connecting passageway sections may be assembled in any desired number cooperatively in motion interlock relationship with an equal number of associated stack valve module units. Means to adjust the effective volume of the enclosure in which the hydraulic liquid is confined determines the number of valves (i.e. one or more) in the acting group and the corresponding number in the reacting group.

These and other features, objects and advantages will become more fully evident from the following description with reference to the accompanying drawings.

Figure 1:
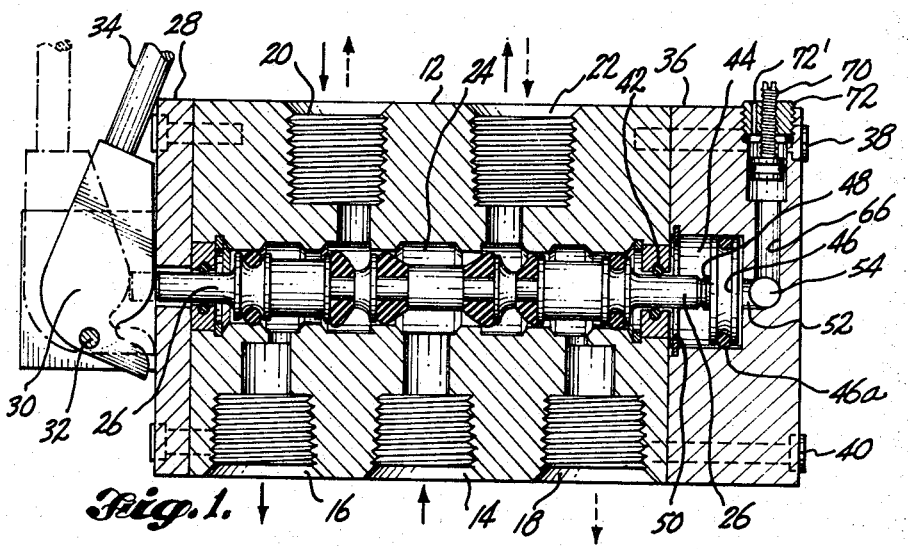
FIG. 1 is a side view of a stack valve module unit and interlock module unit assembly embodying the invention, the structure being viewed in section as along the line 1—1 of FIG. 3.

In the example each stack valve module is of the pneumatic four-way, five-port common inlet and individual dual exhaust type according to a commercially available design. The details of these stack valve units have no direct bearing on or relationship with the invention, as such, except as background reference material illustrating a typical application. Suffice it to say that each of the assembled stack valve units 10a, 10b—10e (there being 5 in the illustration) comprises a block or body 12 having a pressure inlet port 14 and dual exhaust ports 16 and 18 aligned therewith parallel to the valve spool 26 on the bottom face of the valve body, and interchangeable load supply and return ports 20 and 22 in the top face arranged in a line generally coplanar with the aligned ports 14, 16 and 18 and valve spool. The longitudinal central valve chamber 24 opens through opposite ends of the valve block 12 to permit the front end of the valve spool 26 to project through the front face of the block 12 and through the front cover plate 28 for engagement by the valve actuator cam 30 pivoted at 32 for actuation and release movement by a lever 34 according to typical design practice. Usually the rear end of the valve block also has a cover plate but in this instance it is removed and is replaced by an interlock unit block 36 secured thereto by bolts 38 and 40. The valve spindle's rearward end projects past an O-ring seal 42 coaxially into the one open end of cylindrical chamber 44 formed within block 36. A piston 46 having a peripheral O-ring seal 46a is retained for longitudinal sliding movement in the cylinder bore 44 and has a central button 48 abutable to the projecting end of the main valve stem 26. A split ring 50 seats in a peripheral groove in the cylinder wall adjacent the valve block so as to retain the piston 46 within its bore with the block 36 removed from the block 12.

Preferably the interlock module block 36 has the same width and height as the stack valve block 12 so that assemblies of different numbers of modules may be put together suiting any of different applications. For prebuilt applications, the valve stem 26 could be connected to the piston and the blocks 12 and 36 made one, and, of course, the stack valves and interlock modules could also be machined in a common block, or otherwise combined.

Figure 2:
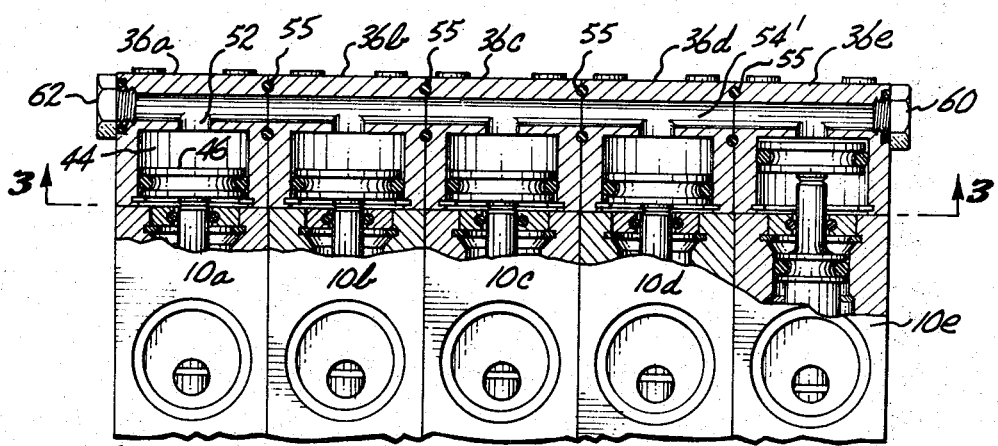
FIG. 2 is a fragmentary top view of the assembly with parts broken away to illustrate primarily interlock piston and hydraulic fluid enclosure arrangements and the coaction thereof with the valve spools.
Figure 3:
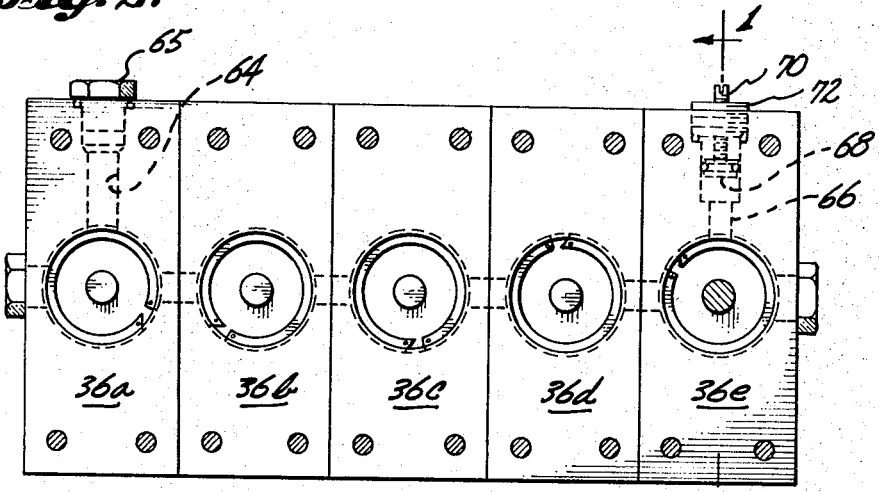
FIG. 3 is a transverse sectional view taken on the valve-interlock module interface plane identified by the line 3-3 in FIG. 2.

The piston bore or cylinder 44 within the interlock body 36 terminates intermediate the front and rear faces of this block and communicates through an end bore 52 of reduced diameter with a cross bore or passage 54 of reduced diameter which extends transversely through the block 36 between its side faces. When a series of such interlock blocks 36a, 36b, —36e are joined to their stack valve blocks 10a, 10b, —10e and the combinations assembled in side-to-side relationship as shown in FIGS. 2 and 3 (the tie bolts through the assembled modules being omitted from the illustration) the bores 54 will line up forming continuous passage 54' affording communication between all of the cylinder spaces 44 on the back sides of their respectively associated pistons 46. O-ring seals 55 around the bores at the interfaces prevent leakage of hydraulic fluid. The outer ends of the endmost sections of passage 54' are threaded to receive closure plugs 60 and 62 completing a hydraulic fluid enclosure space including the passage 54' and the piston bore spaces beyond the pistons. Hydraulic liquid may be introduced into this enclosure conveniently through a riser bore 64 opening at the top of one of the blocks, such as the block 36a (FIG. 3) and normally closed by a plug 65. Another riser bore 66 in one of the other interlock blocks, also leads outwardly from passage 54'. Bore 66 is preferably of stepped diameter and has an intermediate section containing a takeup piston 68 girded with an O-ring seal and connected to an adjustment screw 70 which threads through a threaded nut or plug 72. A breather hole 72' is formed in plug 72. The fitting 72 is locked in position by threading it tightly to a seat so as to remain tight when screw 70 is turned in order to move the piston 68 up and down in its bore. By this adjustment takeup piston 68 may be advanced so as to exert slight pressure on the body of hydraulic fluid confined in the enclosure space. Adjustability of this piston also makes it possible to compensate from time to time for significant thermal expansion and contraction effects and for any slight leakage that may occur past the various seals.

With adequate takeup piston cross section and adjustment stroke, a selection of operating modes is possible. In such a case with the takeup piston in a relatively advanced position, thereby reducing volume of the hydraulic enclosure to a predetermined value, the interlock may be made to operate as in FIG. 2. In that case with a single valve, such as that in unit 10e, in its advanced position, the advancement of any single other valve (such as any in units 10a, 10b, 10c, or 10d) will automatically force the retraction of the valve in unit 10e through the columns of fluid reacting on the associated interlock pistons. However, by retracting the takeup piston by a predetermined amount two valves are permitted to occupy advanced positions simultaneously and will only be returned by automatic action when two others are simultaneously advanced. In any given setting of the valves, however, the hydraulic interlock system remains at rest, consumes no power, and develops no material internal pressure which could produce problems of leakage or unintended respositioning of any valve. The system also lends itself to use of devices equivalent to pistons, such as diaphragms in the nature of membranes or bellows. It is versatile in that any number of valves may be interconnected for interlock purposes whether as part of the same integrated assembly or physically separated from each other. Moreover the distance of separation and the relative placement of the interlocked valves becomes unimportant. The term "valves" includes reversely setable control elements of various types whether they control fluids, mechanical elements or electric cirucuits.

I claim:

1. In a control system, in combination with a plurality of control valves a selected number of which may be set in one sense while a corresponding number of which are being set in the opposite sense, means forming a hydraulic fluid enclosure of limited volume including a plurality of chambers individually associated with the respective valves, said chambers being commonly interconnected for exchange of hydraulic fluid between them such that the displacement of hydraulic fluid into or from one such chamber by an increase or decrease in volume of one chamber or another creates hydraulic pressure tending to produce an opposite change in volume of other such chambers, and respective chamber volume control means individual to each of said chambers and movably connected with their respectively associated valves, each such volume control means being movable to vary chamber volume in one sense by volitional movement of its associated valve in a corresponding sense so as to apply corresponding hydraulic pressure to other such chambers, and each such means being reversely movable, with attendant change of volume of the associated chamber and corresponding reverse movement of the associated valve, in response to applied hydraulic pressure from another chamber.

2. The combination defined in claim 1 wherein the means forming a hydraulic fluid enclosure includes means adjustable so as to vary the contained volume of such enclosure.

3. The combination defined in claim 2, wherein the range of adjustment of the last-mentioned means is sufficient to accommodate a different number of valves which may be set simultaneously in a given position and thereby the corresponding number that will be reset automatically in response to volitional setting of such number of selected other valves.

4. The combination defined in claim 3, wherein the fluid enclosure chambers comprise means forming a plurality of piston bores, and wherein the means in each chamber positionally related to the setting position of the associated valve comprises a piston in each such bore, and means physically extending between the associated valve and the piston to produce conjoint movement of one with the other.

5. The combination defined in claim 4, wherein the valves comprise invdividually housed units of modular form adapted for stacking one in series relationship with others of similar form, and wherein the fluid enclosure comprises a plurality of modular enclosure units adapted for mounting in series relationship and in physical association with said valve units and having aligned passages which, in the mounted position of such enclosure units, form the passage means interconnecting the valve bores.

6. The combination defined in claim 1, wherein the valves comprise individually housed units of modular form adapted for stacking one in series with others of similar form, and wherein the fluid enclosure comprises a plurality of modular enclosure units adapted for mounting in series relationship and in physical association with said valve units and having aligned passages which, in the mounted position of such enclosure units, form the passage means interconnecting the chambers.

7. The combination defined in claim 1, wherein the fluid enclosure chambers comprise means forming a plurality of piston bores, and wherein the means in each chamber positionally related to the setting position of the associated valve comprises a piston in each such bore, and means physically extending between the associated valve and the piston to produce conjoint movement of one with the other.

8. The combination defined in claim 7, wherein the valves comprise individually housed units of modular form adapted for stacking one in series relationship with others of similar form, and wherein the fluid enclosure comprises a plurality of modular enclosure units adapted for mounting in series relationship and in physical association with said valve units and having aligned passages which, in the mounted position of such enclosure units, form the passage means interconnecting the valve bores.